(12) United States Patent
Robinson et al.

(10) Patent No.: US 11,392,657 B2
(45) Date of Patent: Jul. 19, 2022

(54) INTELLIGENT SELECTION AND PRESENTATION OF PEOPLE HIGHLIGHTS ON A COMPUTING DEVICE

(71) Applicant: MICROSOFT TECHNOLOGY LICENSING, LLC, Redmond, WA (US)

(72) Inventors: Lionel Antonio Robinson, Sammamish, WA (US); Vegard Thue Bjørlykke, Oslo (NO); Katrine Øverlie Svela, Oslo (NO); Jon Meling, Troms (NO); Andreea Sandu, Kirkland, WA (US); Srinivas Pushkar Ravipati, Redmond, WA (US); Cem Aykan, Issaquah, WA (US); Polijana Andrijana Nincevic, Oslo (NO); Bergljot Engen, Oslo (NO); Matthew Gunter Kroe, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 195 days.

(21) Appl. No.: 16/789,669

(22) Filed: Feb. 13, 2020

(65) Prior Publication Data

US 2021/0256080 A1 Aug. 19, 2021

(51) Int. Cl.
*G06F 16/00* (2019.01)
*G06F 16/9536* (2019.01)
(Continued)

(52) U.S. Cl.
CPC ...... *G06F 16/9536* (2019.01); *G06F 16/9535* (2019.01); *G06F 16/9538* (2019.01)

(58) Field of Classification Search
CPC ............. G06F 16/9536; G06F 16/9535; G06F 16/9538
See application file for complete search history.

(56) References Cited

U.S. PATENT DOCUMENTS

| 6,938,690 B2 | 9/2005 | Surjaatmadja |
| 10,536,551 B2 | 1/2020 | Debald et al. |

(Continued)

FOREIGN PATENT DOCUMENTS

EP 1271371 A2 1/2003

OTHER PUBLICATIONS

"Non Final Office Action Issued in U.S. Appl. No. 16/702,785", dated Mar. 18, 2021, 17 Pages.
(Continued)

*Primary Examiner* — Hung Q Pham
(74) *Attorney, Agent, or Firm* — Shook, Hardy & Bacon L.L.P.

(57) ABSTRACT

Technology is disclosed for selecting at least one people highlight, with respect to a person of interest, to be shown on one or more user devices. The user device is monitored to determine a user interest in a person of interest. A set of possible people highlights, with respect to the person of interest is determined. A determination is made as to whether any of the possible people highlights should be suppressed and not presented to the user on the user device. Any people highlights that were determined to be people highlights that should be suppressed and not presented are removed to create a remaining set of possible people highlights. At least one of the remaining set of possible people highlights are presented on the user device.

20 Claims, 6 Drawing Sheets

(51) Int. Cl.
*G06F 16/9535* (2019.01)
*G06F 16/9538* (2019.01)

(56) References Cited

U.S. PATENT DOCUMENTS

| | | |
|---|---|---|
| 2005/0076013 A1 | 4/2005 | Hilbert et al. |
| 2007/0271232 A1 | 11/2007 | Mattox et al. |
| 2010/0299363 A1 | 11/2010 | Bhattacharjee et al. |
| 2011/0014897 A1 | 1/2011 | Finucan |
| 2012/0290950 A1 | 11/2012 | Rapaport et al. |
| 2013/0282828 A1 | 10/2013 | Lawler et al. |
| 2013/0332460 A1 | 12/2013 | Pappas et al. |
| 2014/0052718 A1 | 2/2014 | Waupotitsch et al. |
| 2014/0365513 A1 | 12/2014 | Jafry et al. |
| 2015/0019522 A1 | 1/2015 | Kim et al. |
| 2015/0100893 A1 | 4/2015 | Petroff et al. |
| 2015/0135096 A1 | 5/2015 | Dhara et al. |
| 2015/0163320 A1 | 6/2015 | Hu et al. |
| 2015/0205822 A1 | 7/2015 | Jain et al. |
| 2016/0070790 A1 | 3/2016 | Bhat et al. |
| 2017/0085691 A1 | 3/2017 | Kim et al. |
| 2017/0289301 A1 | 10/2017 | Gamaley et al. |
| 2017/0346917 A1 | 11/2017 | Busayarat et al. |
| 2018/0198884 A1* | 7/2018 | Debald ................. G06Q 10/10 |
| 2020/0153930 A1 | 5/2020 | Debald et al. |

OTHER PUBLICATIONS

"Summons to Attend Oral Proceedings Issued in European Patent Application No. 18701078.0", dated Apr. 22, 2021, 10 Pages.

"Enhance Your Site's Attributes", Retrieved From: https://web.archive.org/web/20160725162425/https://developers.google.com/search/docs/guides/enhance-site, Jul. 25, 2016, 7 Pages.

"How do I Add a Context Card to My Lead Ad Form?", Retrieved From: https://web.archive.org/web/20160331091454/https://www.facebook.com/business/help/1664458123767694, Mar. 31, 2016, 2 pages.

"International Search Report and Written Opinion Issued in PCT Application No. PCT/US2018/012228T", dated Mar. 2, 2018, 12 Pages.

"Final Office Action Issued in U.S. Appl. No. 15/399,921", dated Apr. 19, 2019, 25 Pages.

"Non Final Office Action Issued in U.S. Appl. No. 15/399,921", dated Jan. 3, 2019, 19 Pages.

"Notice of Allowance Issued in U.S. Appl. No. 15/399,921", dated Sep. 17, 2019, 15 Pages.

"Final Office Action Issued in U.S. Appl. No. 16/702,785", dated Nov. 17, 2020, 18 Pages.

"Non Final Office Action Issued in U.S. Appl. No. 16/702,785", dated Aug. 4, 2020, 18 Pages.

"Office Action Issued in European Patent Application No. 18701078.0", dated May 20, 2020, 8 Pages.

Sanderse, Wannes, "Google Now!", In MA Thesis Submitted to University of Amsterdam, Jun. 27, 2014, 41 Pages.

"Final Office Action Issued in U.S. Appl. No. 16/702,785", dated Sep. 30, 2021, 18 Pages.

* cited by examiner

INTELLIGENT SELECTION AND PRESENTATION OF PEOPLE HIGHLIGHTS ON A COMPUTING DEVICE

BACKGROUND

Personal computing devices, such as laptops, computers, and smartphones, now carry and display a great variety of information and are used in a variety of settings. In turn, a variety of people may be encountered through these computing devices. It would be helpful to provide information highlights about people encountered to help the user contextualize who the person is, how they might be connected to the user, as well as provide timely event driven information. However, it would also be advantageous in certain situations to conceal some or all of the people highlight information, so that only information considered truly useful to the user is presented, without annoying or distracting the user.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards technologies for improving selection of people highlight information presented on personal computing devices (sometimes referred to herein as mobile devices or user devices). In particular, embodiments provide technology to selectively determine people highlight information to display, and not display, on a user device based upon the user's past behavior (or a similar user's past behavior) with similar people highlight information, personal settings or preferences, and/or the people highlight history (frequency of highlights, highlights already presented, or other history), and other presentation logic.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for facilitating and improving people highlight information presented on personal computing devices. The coalescence of telecommunications and personal computing technologies in the modern era has enabled, for the first time in human history, information on demand combined with a ubiquity of personal computing resources (including mobile personal computing devices and cloud-computing coupled with communication networks). As a result, it is increasingly common for users to rely on one or more mobile computing devices throughout the day for handling various tasks. It is also now possible to provide information to the user regarding other people relevant to a particular task, location, communication, application use, or other contextual situation, referred to collectively as people highlight information or people highlights. But these people highlights may not always be useful to any particular user. In some instances, providing these people highlights may be seen by a particular user as unhelpful. As such, as described below, the disclosed technology also now offers the opportunity to present only people highlight information most likely desired by a user for display, and to conceal or suppress from display other people highlights that are not likely desired for display. Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices.

Accordingly, solutions provided herein include technologies for improving, or providing improved control over, the presentation or display of people highlights on computing devices. The solution monitors a user device to determine a user interest (explicit interest and/or implicit interest) in a person of interest. A people highlight determiner identifies a set of possible people highlights, with respect to the person of interest. In some aspects, the identified set of possible people highlights is ranked or ordered. A suppression engine determines whether any of the possible people highlights should be suppressed and not presented to the user on the user device. People highlights that are determined to be people highlights that should be suppressed and not presented are removed to create a remaining set of possible people highlights. At least one of the remaining set of possible people highlights are presented on the user device. By suppressing or removing people highlights that are potentially annoying or unhelpful to the user, the remaining people highlights that are presented are more likely to be seen as helpful and desirable by the user.

Figure 1:
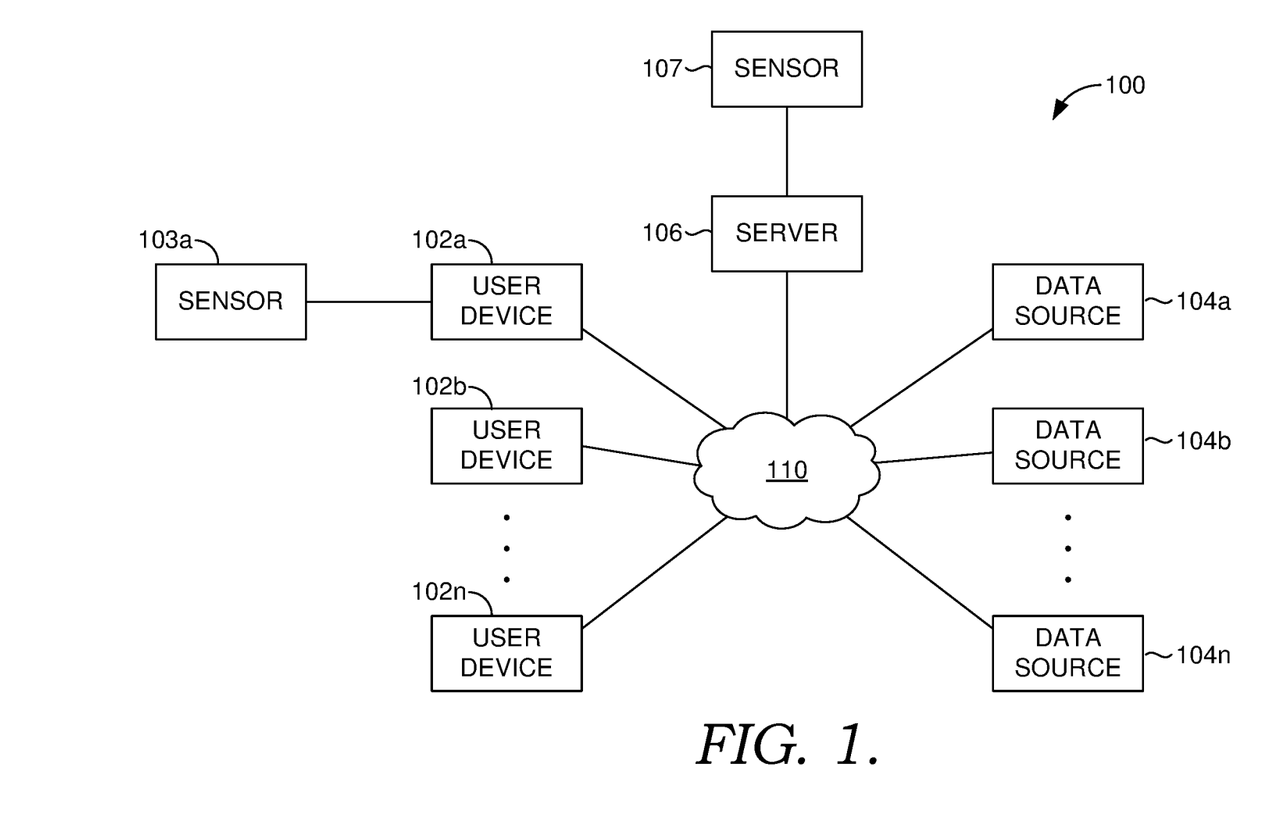
FIG. 1 is a block diagram of an example operating environment suitable for implementations of the present disclosure.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 5 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a handheld communications device, a gaming device or system, an entertainment system, a consumer electronic device, a workstation, or any combination of these delineated devices, a combination of these devices, or any other suitable computer device.

Data sources 104a and 104b through 104n may comprise data sources and/or data systems, which are configured to make data available to any of the various constituents of operating environment 100, or system 200 described in connection to FIG. 2. For instance, in one embodiment, one or more data sources 104a through 104n provide (or make available for accessing) people data and person of interest data, which may include user-activity related data, to people-data collection component 210 of FIG. 2. Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed people data made available by data sources 104a through 104n are described further in connection to people-data collection component 210 of FIG. 2.

Figure 2:
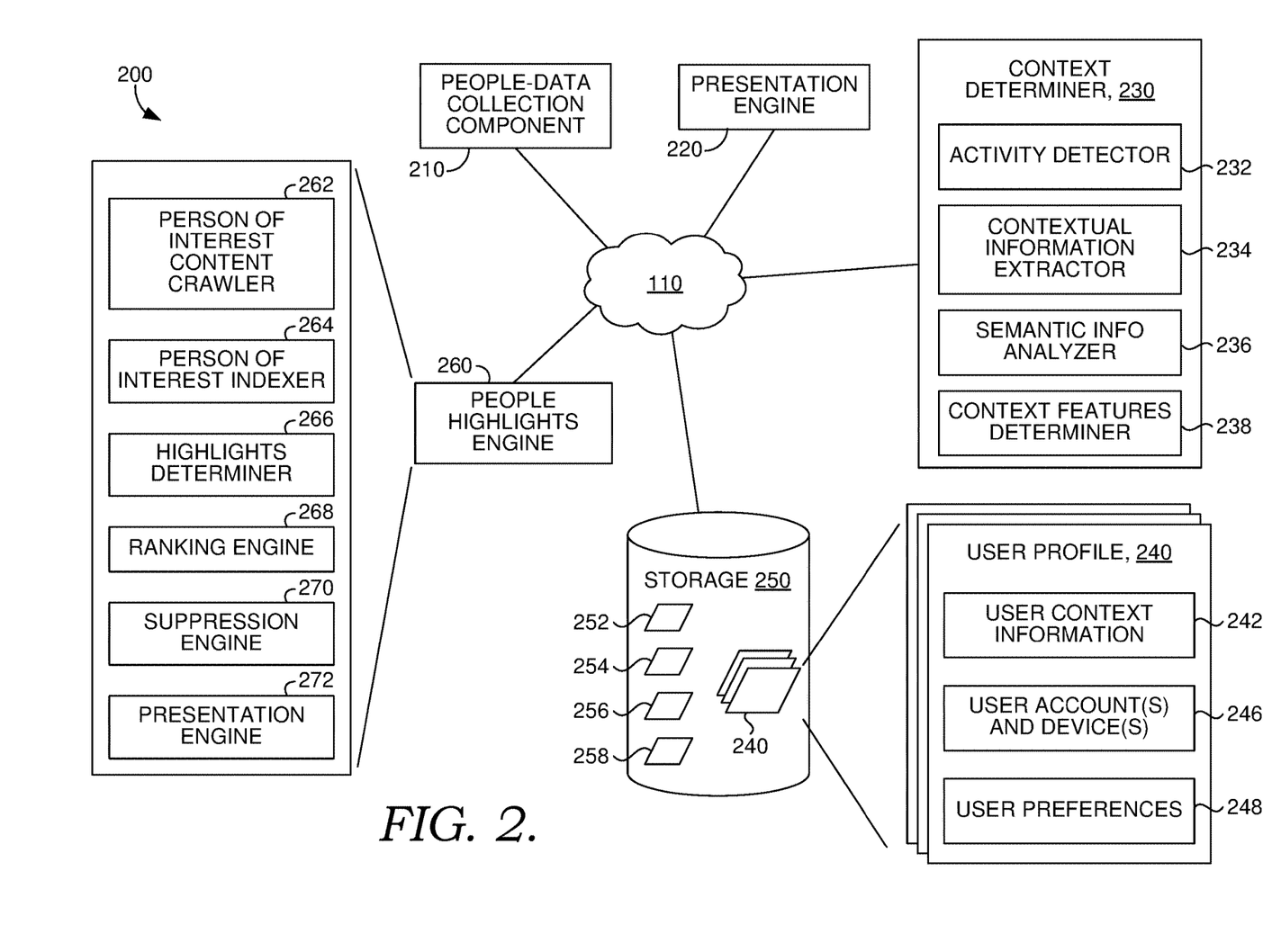
FIG. 2 is a diagram depicting an example computing architecture suitable for implementing aspects of the present disclosure.

Operating environment 100 can be utilized to implement one or more of the components of system 200, described in FIG. 2, including components for collecting people data; monitoring or determining user tasks, user activity and events, user patterns (e.g., usage, behavior, or activity patterns), user preferences, and/or similar categories of data regarding a person of interest, context data, or related information to facilitate sharing context or to otherwise provide an improved user experience; and/or presenting selected people highlights to users. Operating environment 100 also can be utilized for implementing aspects of method 400 in FIG. 4.

Referring now to FIG. 2, with FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including people-data collection component 210, presentation engine 220, context determiner 230, storage 250, and people highlights engine 260. People-data collection component 210, presentation engine 220, context determiner 230, storage 250, and people highlights engine 260 may be embodied as a set of compiled computer instructions or functions, program modules, computer software services, or an arrangement of processes carried out on one or more computer systems, such as computing device 500 described in connection to FIG. 5, for example.

In one embodiment, the functions performed by components of system 200 are associated with one or more personal assistant or assistance applications, services, or routines to provide only selected people highlights in association with a person of interest and a computing experience of the user. In particular, such applications, services, or routines may operate on one or more user devices (such as user device 102*a*) and/or servers (such as server 106). Moreover, in some embodiments, these components of system 200 may be distributed across a network, including one or more servers (such as server 106) and client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, or hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), or Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, people-data collection component 210 is generally configured to access or receive (and in some cases also identify) people data (with respect to both a user and a person of interest) from one or more data sources, such as data sources 104*a* and 104*b* through 104*n* of FIG. 1. In some embodiments, people-data collection component 210 may be employed to facilitate the accumulation of people data of a particular user (or in some cases, a plurality of users including crowdsourced data) for activity detector 232 or more generally context determiner 230. The data may be received (or accessed), and optionally accumulated, reformatted, and/or combined, by people-data collection component 210 and stored in one or more data stores such as storage 250, where it may be available to other components of system 200. For example, the people data may be stored in or associated with a user profile 240, as described herein. In some embodiments, any personally identifying data (i.e., people data that specifically identifies particular users) is either not uploaded or otherwise provided from the one or more data sources with people data, is not permanently stored, is de-identified, and/or is not made available to context determiner 230. In some embodiments, a user may opt into or out of services provided by the technologies described herein and/or select which user data and/or which sources of user data are to be captured and utilized by these technologies.

People data, generally, may be any information that is related to a person, or group of people, that informs a user about an aspect of that person or group of people, and may be received from a variety of sources and may be available in a variety of formats. By way of example and without limitation, people data may comprise contact information (e.g., email, instant message, phone, and may also specify a person's communication preferences); location information (e.g., a person's current location or location of a particular office where they work); presence; recent activity, which may comprise activity relevant to the user (e.g., that the person of interest has an upcoming meeting with the user or recently emailed the user); task-related information (e.g., outstanding tasks that the user has with regard to the person of interest, or outstanding tasks that the person of interest has with respect to the user); information about the person of interest that they may choose to share (e.g., birthday, anniversary, etc.); information in common with the user (e.g., common project teams, work groups, backgrounds, education, interests or hobbies). Additional examples of people data are described herein.

In some embodiments, people data received via people-data collection component 210 may be obtained from a data source (such as data source 104(*a*) in FIG. 1, which may be a social networking site, a professional networking site, or other data source containing people data) or determined via one or more sensors (such as sensors 103*a* and 107 of FIG. 1), which may be on or associated with one or more user devices (such as user device 102*a*), servers (such as server 106), and/or other computing devices. As used herein, a sensor may include a function, routine, component, or combination thereof for sensing, detecting, or otherwise obtaining information such as people data from a data source 104*a*, and may be embodied as hardware, software, or both. By way of example and not limitation, people data may include data that is sensed or determined from one or more sensors (referred to herein as sensor data), such as location information of mobile device(s), properties or characteristics of the user device(s), user-activity information (for example: app usage; online activity; searches; voice data such as automatic speech recognition; activity logs; communications data including calls, texts, instant messages, and emails; website posts; other people data associated with communication events) including, user history, session logs, application data, contacts data, calendar and schedule data, notification data, social-network data, ecommerce activity, user-account(s) data (which may include data from user preferences or settings associated with a personalization-related application, a personal assistant application or service), global positioning system (GPS) data, other user device data (which may include device settings, profiles, network-related information, payment or credit card usage data, purchase history data, other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

People data, particularly in the form of contextual information, can be received by people-data collection component 210 from one or more sensors and/or computing devices associated with a user. In some embodiments, people-data collection component 210, context determiner 230 (or one or more of its subcomponents), or other components of system 200 may determine interpretive data from received people data. Interpretive data corresponds to data utilized by the components or subcomponents of system 200 that comprises an interpretation from processing raw data, such as venue information interpreted from raw location information. Interpretive data can be used to provide context to people data, which can support determinations or inferences carried out by components of system 200. Moreover, it is contemplated that some embodiments of the disclosure use people data alone or in combination with interpretive data for carrying out the objectives of the subcomponents described herein. It is also contemplated that some people data may be processed, by the sensors or other subcomponents of people-data collection component 210 not shown, such as for interpretability by people-data collection component 210. However, embodiments described herein do not limit the people data to processed data and may include raw data or a combination thereof, as described above.

In some respects, people data may be provided in user-data streams or signals. A "user signal" can be a feed or stream of people data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, people-data collection component 210 receives or accesses data continuously, periodically, or as needed. In some embodiments, the people information/people data received by people-data collection component 210 is stored in storage 250, such as in people information and highlights 258.

Context determiner 230 is generally responsible for monitoring people data (such as that collected by people-data collection component 210) for information that may be used for determining user context, which may include features (sometimes referred to herein as "variables") or other information regarding specific user actions and related contextual information. Embodiments of context determiner 230 may determine, from the monitored people data, a user context associated with a particular user or user device. As described previously, the user context information determined by context determiner 230 may include user information from multiple user devices associated with the user and/or from cloud-based services associated with the user (such as email, calendars, social media, or similar information sources), and which may include contextual information associated with the identified user activity (such as location, time, venue specific information, or other people present). Context determiner 230 may determine current or near-real-time user information and may also determine historical user information, in some embodiments, which may be determined based on gathering observations of a user over time. Further, in some embodiments, context determiner 230 may determine user context from other similar users.

As described previously, user context features may be determined by monitoring people data received from people-data collection component 210. In some embodiments, the people data and/or information about the user context determined from the people data is stored in a user profile, such as user profile 240.

In an embodiment, context determiner 230 comprises one or more applications or services that analyze information detected via one or more user devices used by the user and/or cloud-based services associated with the user, to determine user-related or user-device-related contextual information. Information about user devices associated with a user may be determined from the people data made available via people-data collection component 210, and may be provided to context determiner 230 or people highlights engine 270, or other components of system 200.

Some embodiments of context determiner 230, or its subcomponents, may determine a device name or identification (device ID) for each device associated with a user. This information about the identified user devices associated with a user may be stored in a user profile associated with the user, such as in user accounts and devices 246 of user profile 240. In an embodiment, the user devices may be polled, interrogated, or otherwise analyzed to determine information about the devices. This information may be used for determining a label or identification of the device (e.g., a device ID) so that the user interaction with the device may be recognized by context determiner 230. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

Context determiner 230, in general, is responsible for determining (or identifying) contextual information about a user or user-device associated with a user. Embodiments of activity detector 232 may be used for determining current user activity or one or more historical user actions. Some embodiments of activity detector 232 may monitor people data for activity-related features or variables corresponding to user activity such as, for example, user location; indications of applications launched or accessed; files accessed, modified, or copied; websites navigated to; online content downloaded and rendered or played; or similar user activities.

Contextual information extractor 234, in general, is responsible for determining contextual information related to the user activity (detected by activity detector 232 or context determiner 230), such as context features or variables associated with user activity, related information, and user-related activity, and is further responsible for associating the determined contextual information with the detected user activity. In some embodiments, contextual information extractor 234 may associate the determined contextual information with the related user activity and may also log the contextual information with the associated user activity. Alternatively, the association or logging may be carried out by another service. For example, some embodiments of contextual information extractor 234 provide the extracted contextual information to context features determiner 238, which determines user context using information from the activity detector 232, the contextual information extractor 234, and/or the semantic information analyzer 236.

Some embodiments of contextual information extractor 234 (or semantic information analyzer 236, described below) determine contextual information related to a user action or activity event such as entities identified in a user activity or related to the activity (e.g., recipients of a group email sent by the user), which may include nicknames used by the user (e.g., "mom" and "dad" referring to specific entities who may be identified in the user's contacts by their actual names); information about the current user of the user device (e.g., whether the user is the owner or another user, the age of the current user, the relationship of the current user to the owner, such as a close friend, co-worker, family member, or unknown entity); or user activity associated with the location or venue of the user's device, which may include information about other users or people present at the location. By way of example and not limitation, this may include context features such as location data; contextual information about the location; user device characteristics or user device identification information regarding the device; duration of the user activity; other information about the activity such as entities associated with the activity (e.g., venues, people, objects); information detected by sensor(s) on user devices associated with the user that is concurrent or substantially concurrent to the user activity; or any other information related to the user activity that is detectable that may be used for determining patterns of user activity.

In some embodiments, a device name or identification (device ID) may be determined for each device associated with a user. This information about the identified user devices associated with a user may be stored in a user profile associated with the user, such as in user account(s) and device(s) 246 of user profile 240. In an embodiment, the user devices may be polled, interrogated, or otherwise analyzed to determine contextual information about the devices. This information may be used for determining information about a current user of a user device, or determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

In some implementations, contextual information extractor 234 may receive people data from people-data collection component 210, parse the data, in some instances, and identify and extract context features or variables (which may also be carried out by context features determiner 238). Context variables may be stored as a related set of contextual information associated with the user activity, and may be stored in a user profile such as in user context information component 242. Contextual information also may be determined from the people data of one or more users, in some embodiments, which may be provided by people-data collection component 210 in lieu of or in addition to user activity information for the particular user.

Semantic information analyzer 236 is generally responsible for determining semantic information associated with the user-activity related features identified by activity detector 232 or contextual information extractor 234. For example, while a user-activity feature may indicate a specific website visited by the user, semantic analysis may determine the category of website, related websites, themes or topics, or other entities associated with the website or user activity. Semantic information analyzer 236 may determine additional user-activity related features semantically related to the user activity, which may be used for further identifying user context.

In particular, as described previously, a semantic analysis is performed on the user activity information and/or the contextual information, to characterize aspects of the user action or activity event. For example, in some embodiments, activity features associated with an activity event may be classified or categorized (such as by type, time frame or location, work-related, home-related, themes, related entities, other user(s) (such as communication to or from another user) and/or relation of the other user to the user (e g, family member, close friend, work acquaintance, boss, or the like), or other categories), or related features may be identified for use in determining a similarity or relational proximity to other user activity events, which may indicate a pattern. In some embodiments, semantic information analyzer 236 may utilize a semantic knowledge representation, such as a relational knowledge graph. Semantic information analyzer 236 may also utilize semantic analysis logic, including rules, conditions, or associations to determine semantic information related to the user activity. For example, a user activity event comprising an email sent to someone who works with the user may be characterized as a work-related activity.

Semantic information analyzer 236 may also be used to characterize contextual information, such as determining that a location associated with the activity corresponds to a hub or venue of the user (such as the user's home, work, gym, or the like) based on frequency of user visits. For example, the user's home hub may be determined (using semantic analysis logic) to be the location where the user spends most of her time between 8 PM and 6 AM. Similarly, the semantic analysis may determine the time of day that corresponds to working hours, lunch time, commute time, or other similar categories. Similarly, the semantic analysis may categorize the activity as being associated with work or home, based on other characteristics of the activity. In this way, the semantic analysis provided by semantic information analyzer 236 may provide other relevant features that may be used for determining user context.

Context features determiner 238 is generally responsible for determining user context-related features (or variables) associated with the user, which may include the context of a user device associated with the user. Context features may be determined from information about a user activity, from related contextual information, and/or from semantic information. In some embodiments, context features determiner 238 receives information from activity detector 232, contextual information extractor 234, and/or semantic information analyzer 236 and analyzes the received information to determine a set of one or more features associated with the user's context.

Examples of user context-related features include, without limitation, location-related features, venue-related information associated with the location, or other location-related information; other users present at the venue or location; time-related features; current-user-related features, which may include information about the current or recent user of the user-device; user device-related features, such as device type (e.g., desktop, tablet, mobile phone, fitness tracker, heart rate monitor), hardware properties or profiles, OS or firmware properties, device IDs or model numbers, battery or power-level information, network-related information, position/motion/orientation-related information about the user device, network usage information, user account(s) accessed or otherwise used (such as device account(s), OS level account(s), or online/cloud-services related account(s) activity, such as Microsoft® account or Net Passport, online storage account(s), email, calendar, or social networking accounts); content-related features, such as online activity (e.g., searches, browsed websites, purchases, social networking activity, communications sent or received including social media posts); or any other features that may be detected or sensed and used for determining the user context.

Example system 200 also includes a people highlights engine 260 that is generally responsible for crawling and indexing content, determining possible people highlights, ranking the highlights and suppressing selected highlights, and presenting at least a portion of the remaining ranked people highlights to a user (or passing the portion of remaining ranked people highlights to presentation engine 220). People highlights engine 260 includes a person of interest content crawler 262 and a person of interest indexer 264 that are generally responsible for scanning or crawling and indexing, for example, content relating to a person of interest, which may include data, programs, applications, or information related to data, programs or applications associated with a user account, user device(s), and/or storage. Content crawler 262 identifies user content, person of interest content, and related information, as broadly defined above, as an input. Again, this content and information could be present on user device(s) or stored remotely, and could also come from people-data collection component 210 or people data/information (which may have been already received by component 210 and) stored on storage 250. The information and content identified by person of interest content crawler 262 is accessed by, or passed to, a person of interest content indexer 264. In some embodiments, person of interest content indexer 264 creates a classified content data index associating metadata with the content.

Person of interest content crawler 262 may also access user preferences 248, which may have settings indicating which user devices and storage may be accessed, and may also specify or include user-defined labels or categories to be used by person of interest content indexer 264. People highlights engine 260 may also access user accounts and devices 246 to identify online or cloud-based storage accounts, email, calendars, and similar sources of content to be classified. Person of interest content crawler 262 and person of interest indexer 264 may identify and classify information about a person of interest similar to user context information 242, including, for example, organizational role (job, social, location within an organizational chart, work collaborator); background (school(s) attended, family members, connected friends); demographic information (social status, hometown, birthdays, work anniversary, cities lived-in, cities or companies worked-in); behavioral information (conversations, frequency of contact (close connection, old acquaintance, stranger)); tasks or obligations (a promised draft or communication on a certain date); and other similar types of information.

People highlights engine 260 also includes a highlights determiner 266. In some embodiments, highlights determiner 266 uses highlights logic 252 to determine a set of possible people highlights for a person of interest relative to the user. Highlights determiner 266 may take as inputs information from person of interest content crawler 262, person of interest indexer 264, people-data collection component 210, context determiner 230 and/or information from user profile 240. Highlights logic 252 may include rules, conditions, associations, classification models, or other criteria to identify and classify the set of possible people highlights. The highlights logic 252 can take many different forms. For example, the classification logic may comprise fuzzy logic, neural network, finite state machine, support vector machine, logistic regression, clustering, topic modeling, or machine learning techniques, similar statistical classification processes or, combinations of these to identify and classify content items, or to predict relevancy of content items to be considered for highlighting. Highlights determiner 266 passes a collected set of people highlights to a ranking engine 268 and in some embodiments the people highlights may be stored in people information and highlights 258. In some embodiments the people highlights (or possible/candidate highlights) that are determined by people highlights engine 260 (and/or highlights determiner 266) may be stored in (or received from) people information and highlights 258. For example, and without limitation, the set of highlights may include things such as: "Say congratulations to James on his 10 year work anniversary"; "See email from John" (calling attention to an unread email); "You have several unread emails from people attending your upcoming meeting"; "Jessica has recently changed positions at the company"; "Kayla is a new hire and will be on the call today"; "Three of the meeting attendees viewed your profile, would you like to update it?"; "Tracy also graduated from the University of Iowa"; "You and Mike have a shared connection with Randy".

The ranking engine 268 receives the collected set of people highlights from highlights determiner 266 and ranks them using ranking logic 254. Ranking logic 254, executed by ranking engine 268 generally determines, from the collected set of people highlights, a narrower set of people highlights ranked to determine the right people highlights to present to a user at the right time. Ranking logic 254 generally considers, among other things: where the people highlight is going to be presented (screen real estate on a phone, laptop to large screen; within a specific surface (word processing application, calendaring application, communication application or other program or application)); the relationship of the person of interest to the user (close connection, a reconnection of an older acquaintance, or a new contact such as a stranger); user inputs and preferences; and/or preferences of other users that are similar to the user. The ranking logic 254 may also limit the ranked set to a specific number of people highlights, as presenting more than a specific number of people highlights may not be desirable. Like highlights logic 252, ranking logic 254 may include rules, conditions, associations, classification models, or other criteria apply a ranking to the set of possible people highlights received from highlights determiner 266. The ranking logic 254 can take many different forms. For example, the ranking logic may comprise Boolean logic, fuzzy logic, decision trees or random forest, finite state machine, support vector machine, logistic regression, clustering, topic modeling, or machine learning techniques, similar statistical classification processes or, combinations of these to rank the received set of people highlights. The ranking engine 268 passes the ranked set of people highlights to the suppression engine 270.

Suppression engine 270 receives the ranked set of people highlights from the ranking engine 268 and generally determines whether any of the received ranked set of people highlights should be suppressed and not presented to the user. Suppression engine 270 uses suppression logic 256 to determine any highlights that should be suppressed. By suppressing certain highlights, the people highlights that are presented are more likely to be valuable and useful to the user. User fatigue caused by too many presented people highlights can be avoided, as well as the potential for user annoyance if the people highlight has already been presented, or if the people highlight is stale or otherwise not timely.

Suppression logic 256 comprises rules, conditions, associations, classification models, or other criteria to identify and/or classify a set of one or more possible people highlights to be suppressed. In some embodiments, suppression logic 256 may comprise logic used for making a binary determination (e.g., whether or not to suppress a particular people highlight or type of highlight), or may comprise logic used by suppression engine 270 for determining a suppression score or suppression weighting, which may be evaluated against a pre-determined threshold (e.g., 0.5 or 50 percent) to determine whether to suppress a particular highlight. In some of these embodiments, the threshold may be determined by the user (e.g., via user preferences) or by a system administrator, may be dependent on the particular highlight type, or may be based on user behavior (e.g., where a user rarely uses highlights or often dismisses highlights, then the threshold may be adjusted lower so that more highlights are likely to satisfy the threshold and thus be suppressed).

Some embodiments of suppression logic 256 comprise logic for modifying a suppression weighting associated with one or more possible people highlights. As described above, a higher suppression weighting for a particular possible people highlight may result in a greater likelihood of that highlight being suppressed. For example, a suppression weighting may be modified based on whether a highlight has been previously shown, dismissed, or interacted with. For instance, in an embodiment, showing a highlight may result in its suppression weighting being increased (making it more likely not to be shown again) and a user dismissing a highlight may also increase its weighting, in some cases even more so than showing the highlight. In some of these example embodiments, determining that a user interacted with a highlight may increase or decrease the weighting, depending on the particular highlight type. For instance, where a user has a pattern of interacting with a particular highlight type, such as contact information, status, or task-related highlights, then the user's interaction may indicate that the user relies on this information and thus this type of highlight is valuable to the user. Accordingly, the suppression weighting for this highlight (or for highlights of this type) may be decreased. For other types of highlights, such as those that are temporal and only likely to result in user action once, suppression weighting may be increased following a determination of user interaction (or likely user interaction) with the highlight. For example, where the highlight type is a date event or a highlight type that is temporal, such as a birthday or anniversary, then the interaction might indicate that the user has acted on the particular highlight. Therefore, its suppression weighting may be increased, according to suppression logic 256, making it less likely to be presented again.

In some embodiments, suppression logic 256 may utilize user behavior rules, periodic/time based rules, user interest, and/or people highlight context rules. In particular, user behavior rules (or logic) utilizes historic user activity patterns or behaviors for the user or similar users (e.g., the user never views or interacts with people highlights relating to birthdays or social information; the user only views work information; the user has quickly dismissed or closed similar people highlights in the past; or other user activity or patterns of user activity related to people highlights), to determine whether to suppress one or more particular people highlights. The user activity or behavior information may be received from user context information 242 or may be determined by context determiner 230 or activity detector 232. For example, a highlight of a certain category that is consistently dismissed by a user's colleagues (similar users), such as a person's birthday, may be determined to be suppressed for the user.

In some embodiments, periodic and/or time based rules (or logic) may comprise logic for suppressing a highlight based on whether it has been presented recently or whether the highlight is stale. Some embodiments of periodic and/or time based rules or logic comprise logic for increasing, decreasing or modifying a suppression weighting associated with a people highlight; for instance, a suppression weighting may be increased each time the highlight is shown to the user. Similarly, in some embodiments, this logic may increase the suppression weighting of a people highlight after an interval of time (e.g., 1 day, 2 days, 1 week, or other time interval). In this way, highlights that may grow stale, such as date-related highlights like birthdays, anniversaries, or events, are less likely to be presented as time passes after the date associated with the highlight. The particular time interval may be based on the particular content of the highlight or the type of highlight (e.g., birthday, which may be for 1-2 days, a promotion announcement, which may be for 1 week), for example.

User interest rules (or logic) may be utilized to determine or predict a likely user suppression interest (i.e., whether a user would likely want to see or not want to see a particular highlight or highlight type) associated with a particular people highlight or type of highlight. For example, the user interest logic may utilize implicit information to infer or predict the user interest or explicit information, such as explicit user settings (where the user has indicated they do not value or desire certain people highlights, or categories of highlights, such as social highlights, birthdays, work anniversaries, or employment history). Without limitation, examples of implicit information for determining or predicting user interest may comprise user settings of similar users or activity of the user (which may include user behavior or an activity pattern) or similar users with regard to similar people highlights or similar people highlight types.

People highlight context rules (or logic) utilizes contextual information to determine an indication of whether to suppress a highlight or type of highlight. The contextual information may be determined by context determiner 230 or received from user context information 242. For example, contextual information may indicate that a particular task has been completed, and thus a highlight associated with the task should be suppressed because it is no longer relevant. Similarly, contextual information may indicate that a particular people highlight was already presented within a recent time interval (e.g., within the past few days, or within a session).

In some embodiments, suppression logic 256 may comprise logic for determining suppression based on information about the behavior of other users similar to the user (e.g., similar users have interacted with a similar people highlight; or similar users never respond to people highlights with work-related information). Suppression logic 256 also may include rules based on personal preferences or settings of the user or the person of interest. For example, a particular person of interest may desire not to show his birthday information as a highlight, and thus may configure a setting to do so.

The suppression logic 256 can take many different forms. For example, the suppression logic may comprise Boolean logic, fuzzy logic, neural network, finite state machine, support vector machine, decision tree or random forest, logistic regression, clustering, topic modeling, reinforcement learning model (e.g., wherein user dismissal of a highlight results in a penalty and/or where user interaction with a highlight results in a reward) or other machine learning techniques, similar statistical classification or machine-learning prediction processes or, combinations of these to determine any of the ranked set of people highlights to suppress. In some embodiments, suppression logic 256 may be based on activity or activity-patterns learned from other users, which may include other similar users. For example, where it is learned that a particular user's coworkers (similar users) often dismiss or ignore birthday-related highlights, it may be inferred that the office culture does not celebrate birthdays. From the observed pattern of dismissing birthday highlights, suppression logic 256 may learn a rule to suppress people highlights for birthday information for the particular user. In some embodiments, this learned logic may include rules that are explicitly defined by other users (such as user configurations of other users specifying to suppress people highlights of a social nature when the current context indicates that user is at work) or implicit rules (which may be determined based on monitoring the user activity of another user, as described above for the primary user). In this way, as new people highlights are developed or evolved, embodiments of the technologies described herein can adapt and continue to provide the benefits that a user desires. Suppression engine 270 thus removes or suppresses any identified people highlights from the ranked set of people highlights received from the ranking engine 268 and passes the revised set of remaining ranked people highlights to presentation engine 272 or a separate presentation engine 220.

One or more of the highlights determiner 266, ranking engine 268, or presentation engine 272 may determine how many people highlights, if any, should be presented to the user. This determination might be made, for example, based upon the device's screen size (with potentially more people highlights presentable on a laptop computer as compared to a cell phone) or the surface on which the people highlights will be presented (for example a calendaring application, communication platform, or other application or program).

Figure 3A:
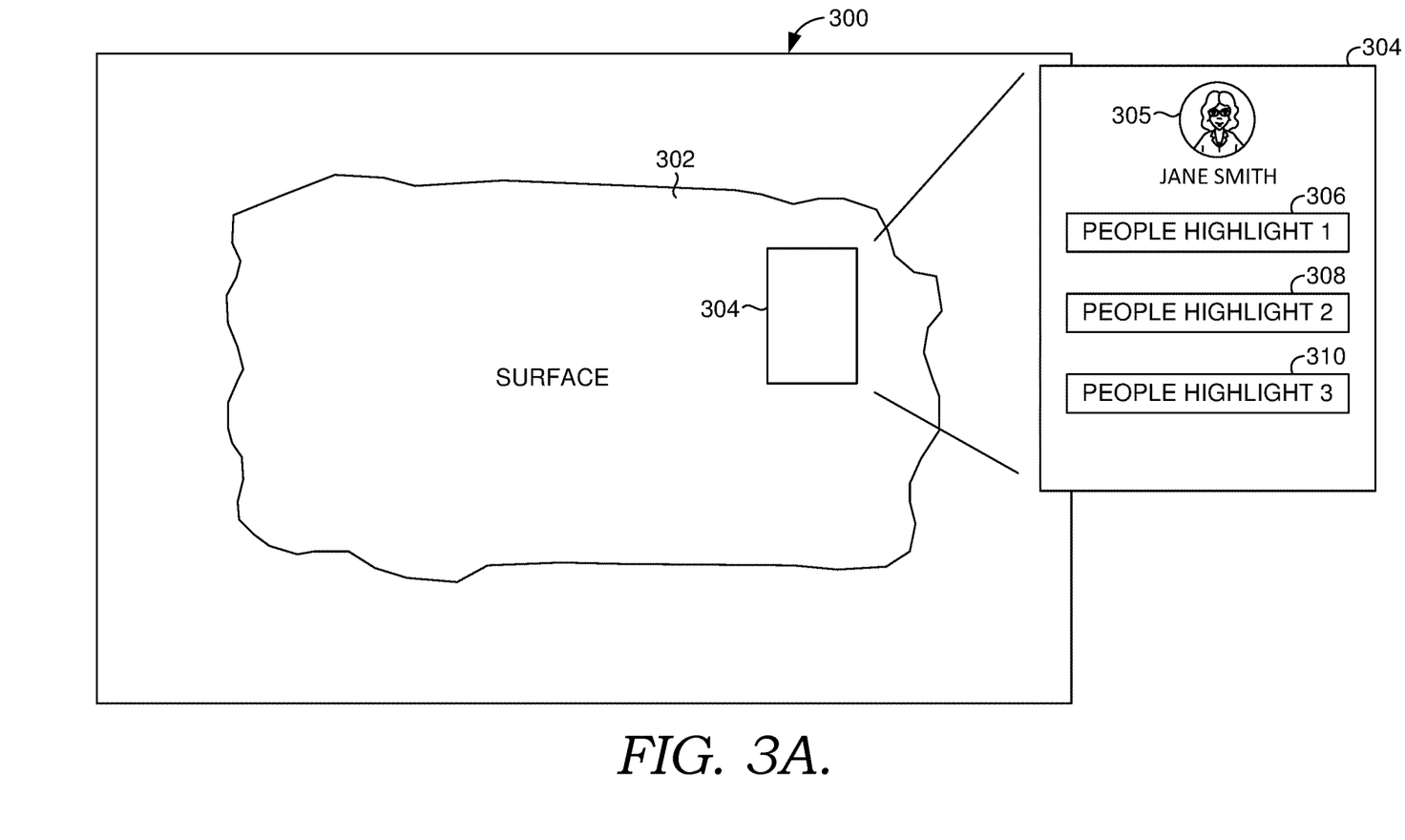
FIGS. 3A-3B illustratively depict exemplary schematic screenshots from a personal computing device showing aspects of example graphical user interfaces, in accordance with an embodiment of the present disclosure.
Figure 3B:
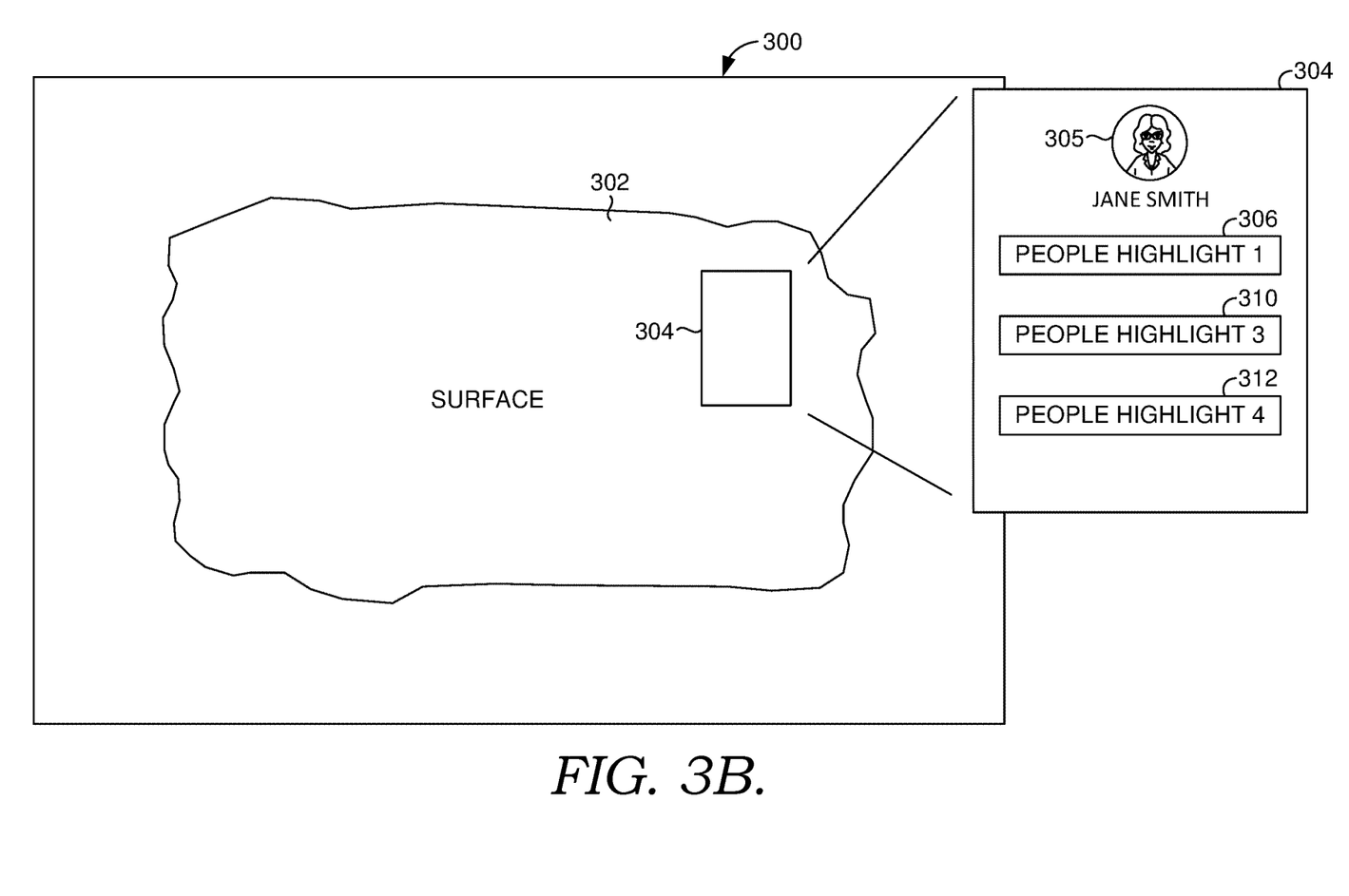

An exemplary schematic screen display 300 is shown in FIG. 3A, which represents any of the computing device(s) 102(*n*) discussed above with respect to FIG. 1. Screen display 300 is shown having a schematic surface 302, which could be any of a number of different programs, applications or other display on the computing device screen display 300. A smaller display space 304 is shown, which could be, for example, a people card or other type of informational display. Within display space 304, a number of people highlights are shown as People Highlight 1 (306), People Highlight 2 (308), and People Highlight 3 (310) for an example person (305). In this exemplary screen display 300, three people highlights are shown and may be the highest three people highlights ranked by ranking engine 268. Another exemplary screen display 300 is shown in FIG. 3B, which also shows three people highlights for the person (305). Here, however, within display space 304, the people highlights shown are People Highlight 1 (306), People Highlight 3 (310), and People Highlight 4 (312). The difference between FIG. 3A and FIG. 3B is that People Highlight 2 (308) is suppressed (with respect to FIG. 3B) by, for example, suppression engine 270 and/or according to suppression logic 256. With People Highlight 2 suppressed, and with the screen real estate to show, for example, three people highlights, another people highlight, e.g., People Highlight 4 (312), can be displayed, if available.

Example system 200 also includes storage 250. Storage 250 generally stores information including data, computer instructions (e.g., software program instructions, routines, or services), logic, profiles, and/or models used in embodiments described herein. In an embodiment, storage 250 comprises a data store (or computer data memory). Further, although depicted as a single data store component, storage 250 may be embodied as one or more data stores or may be in the cloud.

As shown in example system 200, storage 250 includes user profile 240 and highlights logic 252, ranking logic 254 and suppression logic 256. One example embodiment of a user profile 240 is illustratively provided in FIG. 2. Example user profile 240 includes information associated with a particular user such as user context information 242 (from context determiner 230), information about user accounts and devices 246, and user preferences 248. The information stored in user profile 240 may be available to the people highlights engine 260 and other components of example system 200.

As described previously, user context information 242 generally includes information describing the overall state of the user, which may include information regarding the user's device(s), the user's surroundings, activity events, related contextual information, activity features, or other information determined via context determiner 230, and may include historical or current user activity information. In some embodiments, user context information 242 may also include semantic information determined by semantic information analyzer 236.

User accounts and devices 246 generally includes information about user devices accessed, used, or otherwise associated with a user, and/or information related to user accounts associated with the user; for example, online or cloud-based accounts (e.g., email, social media) such as a Microsoft® Net passport, other accounts such as entertainment or gaming-related accounts (e.g., Xbox live, Netflix, online game subscription accounts, or similar account information), people data relating to such accounts such as user emails, texts, instant messages, calls, other communications, and other content; social network accounts and data, such as news feeds; online activity; and calendars, appointments, application data, other user accounts, or the like. Some embodiments of user accounts and devices 246 may store information across one or more databases, knowledge graphs, or data structures. As described previously, the information stored in user accounts and devices 246 may be determined from people-data collection component 210 or context determiner 230 (including one or more of its subcomponents).

User preferences 248 generally include user settings or preferences associated with the user, and specifically may include user settings or preferences associated with the people highlights engine 260. By way of example and not limitation, such settings may include user preferences about specific people highlights or people highlight categories that the user desires to be suppressed given certain user contexts. The user may specify which data or content should be included for use with the people highlights engine 260. In one embodiment, preferences 248 may include user-defined rules (or group-policy rules, which may be set by an administrator) for presenting people highlights based on a context; for instance, suppressing specifically designated people highlights that are deemed unhelpful or undesirable to a specific user. Further, a graphical user interface may facilitate enabling the user to easily create, configure, or share these user-preferences. For example, in one embodiment, right-clicking on (or touching, or otherwise selecting) a particular people highlight may invoke a menu, a rules wizard, or other user interface that enables the user to specify treatment (i.e., whether to show or suppress a people highlight and according to which context) of that particular people highlight or similar people highlights.

Example system 200 may also include a separate presentation engine 220 that is generally responsible for presenting content and related information to a user, such as the people highlights received from people highlights engine 260, and may work in conjunction with presentation engine 272 of people highlights engine 260. The content may be presented via one or more presentation components 516, described in FIG. 5. Presentation engine 220 may comprise one or more applications or services on a user device, across multiple user devices, or in the cloud. For example, in one embodiment, presentation engine 220 manages the presentation of content to a user across multiple user devices associated with that user. Presentation engine 220 may determine on which user device(s) content is presented, and presents information determined by people highlights engine 270. Presentation engine 220 presents this information, including any substitutions, reorganizations, or highlights as directed by the people highlights engine 270.

Figure 4:
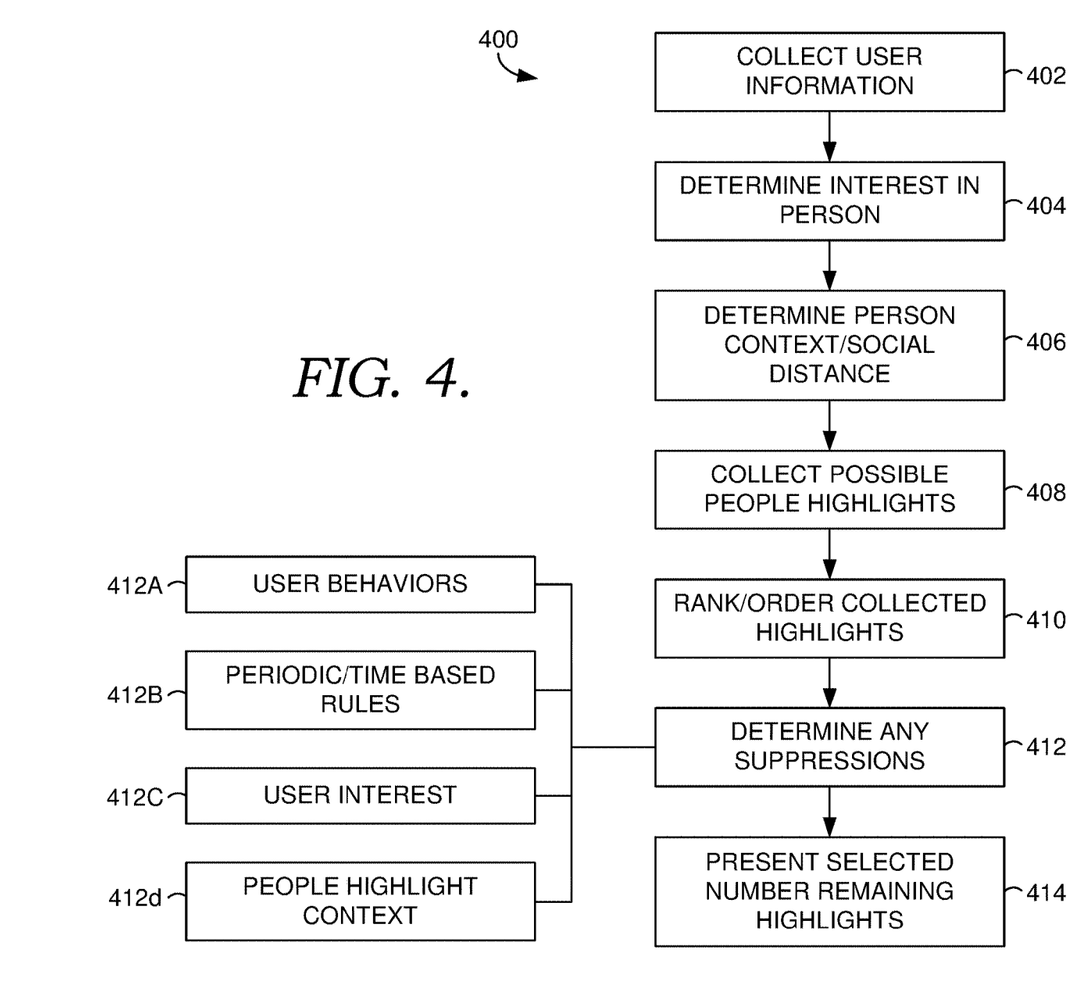
FIG. 4 depicts a flow diagram of a method for intelligently selecting and presenting people highlights to a user, in accordance with an embodiment of the present disclosure.

Turning to FIG. 4, a method 400 for intelligently selecting and presenting people highlights on one or more user devices is shown. As shown at block 402, the method 400 includes collecting user information. The collected user information may include, for example, collecting information about the user and/or about people of possible interest to the user. The information may be collected from, for example, people-data collection component 210, any of the data source(s) 104, or from storage 250 such as in user profile(s) 240. The method 400 also includes, as shown at block 404, determining a user interest in a person. This determining could be from explicit interest from a user (such as hovering over a contact, or initiating a communication with the person) or implicit (such as the person being on a meeting invite, new to a company, or owed a task-result). The method 400, as shown at block 406, includes determining the context and/or social distance between the user and the determined person of interest, as may be performed for example by context determiner 230, person of interest content crawler 262, and/or person of interest indexer 264.

As shown at block 408, the method 400 includes collecting (or determining) a set of possible (or candidate or potential) people highlights. This collected set of possible people highlights may include, for example, any of the exemplary people highlights discussed above, and may be determined by highlights determiner 266. At block 410, the method includes ranking and/or ordering the received set of possible people highlights, and may be done by ranking engine 268, using ranking logic 254, for example. The method 400 also includes, at block 412, determining whether any of the people highlights should be suppressed. The suppression determination may be done, for example, using suppression engine 270 and/or suppression logic 256.

At block 412, suppression logic 256 and/or suppression engine 270 may consider, for example, past user behaviors at block 412A, periodic and/or time based rules at block 412B, user interest at block 412C, and/or people highlight context at block 412D. Past user behaviors 412A generally considers whether user (or similar user) behavior indicates that one or more particular people highlights in the set of possible people highlights should be suppressed. For example, user behaviors 412A may determine, if a people highlight relates to a person in a meeting request previously declined by the user, and accordingly suppress that people highlight. As another example, user behaviors 412A may consider whether the user has already dismissed the same highlight, or a similar highlight, and if so, the people highlight may be suppressed. As yet another example, if the user (or a similar user) has consistently dismissed or ignored a people highlight of a certain category (such as a people highlight indicating a person's birthday), the people highlight may be suppressed.

Periodic and/or time based rules 412B generally use an aspect of suppression logic 256 to determine if the timing of a people highlight indicates it should be suppressed. For example, if the people highlight has already been shown x number of times during a time frame y or for a certain number of sessions z, periodic and/or time based rules 412B may suppress the people highlight. As another example of periodic and/or time based rules 421B, if a user ignores a presented people highlight for two sessions (a session may be, for example a window of time (such as 12 hours) in which the people highlight has been presented one or more times), then suppression logic 256 may determine that the highlight is not valuable or no longer relevant to the user and therefore suppress the highlight.

User interest block 412C uses an aspect of suppression logic 256 to consider or determine user interest with respect to a people highlight, and suppresses any people highlights where the logic indicates a likely user interest to suppress the highlight. For example, user interest at block 412C may be indicated by explicit user settings (where the user has indicated they do not value or desire certain people highlights, or categories of highlights, such as social highlights, birthdays, work anniversaries, or employment history). User interest at block 412C, somewhat similarly to user behavior at block 412A, can also determine user interest implicitly, such as by considering similar users' interest, or similar users' preferences and settings.

Suppression logic 256 may also consider, for example, a people highlight context at block 412D. For example, if the people highlight context or history indicates a likely desire to suppress a people highlight (e.g., a people highlight task has already been completed, or the people highlight was already presented to the user and dismissed), people highlight context 412D may suppress the people highlight. At block 414, the method 400 includes presenting a selected number of remaining (those not suppressed) people highlights. The method may also include, for example, continued monitoring of the user-activity with respect to the people highlights and/or the user context. As the user-activity with respect to the people highlights or the context changes, the method may include determining whether any further modifications to the suppression of people highlights is warranted.

As another example, assume the last two ranked people highlights relate to a work anniversary this week ("Scott has worked with the firm for 25 years"), and a people highlight related to educational history ("Scott also attended the University of Iowa"). The ranking engine 268, using ranking logic 254 will rank these two highlights. In this example, the work anniversary may be ranked higher, given the fact that it is timely, and temporal. Accordingly, the work anniversary people highlight may be presented to, and viewed by, the user. In this example, the work anniversary people highlight may continue to be presented any other time that people highlights are presented for the person of interest during a particular session (such as a 12 hour period). The next time the user sees the card and if the highlight is still available (e.g., not stale, for example, two days later), the user may again see the work anniversary people highlight. Now, assume the user viewed the people highlight, but did not interact with the people highlight (such as by clicking on it). On the next session, (e.g. a third day), the work anniversary people highlight may be suppressed (such as at block 412B), and the next ranked people highlight (here, the educational history highlight) may be presented to the user because the work anniversary people highlight was ignored by the user in the previous two sessions, and/or has become stale.

Another form of suppression may occur by user interaction. For example, if the user clicks an 'X' displayed on the highlight to explicitly remove the highlight, the highlight is suppressed immediately. In some embodiments, explicitly suppressed highlights will not be presented to the user again, while implicitly suppressed highlights may be presented again at a later time, such as months later.

Accordingly, we have described various aspects of technology directed to systems and methods for intelligently selecting and presenting people highlights on personal computing devices. It is understood that various features, subcombinations, and modifications of the embodiments described herein are of utility and may be employed in other embodiments without reference to other features or subcombinations. Moreover, the order and sequences of steps shown in the example method 400 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 5:
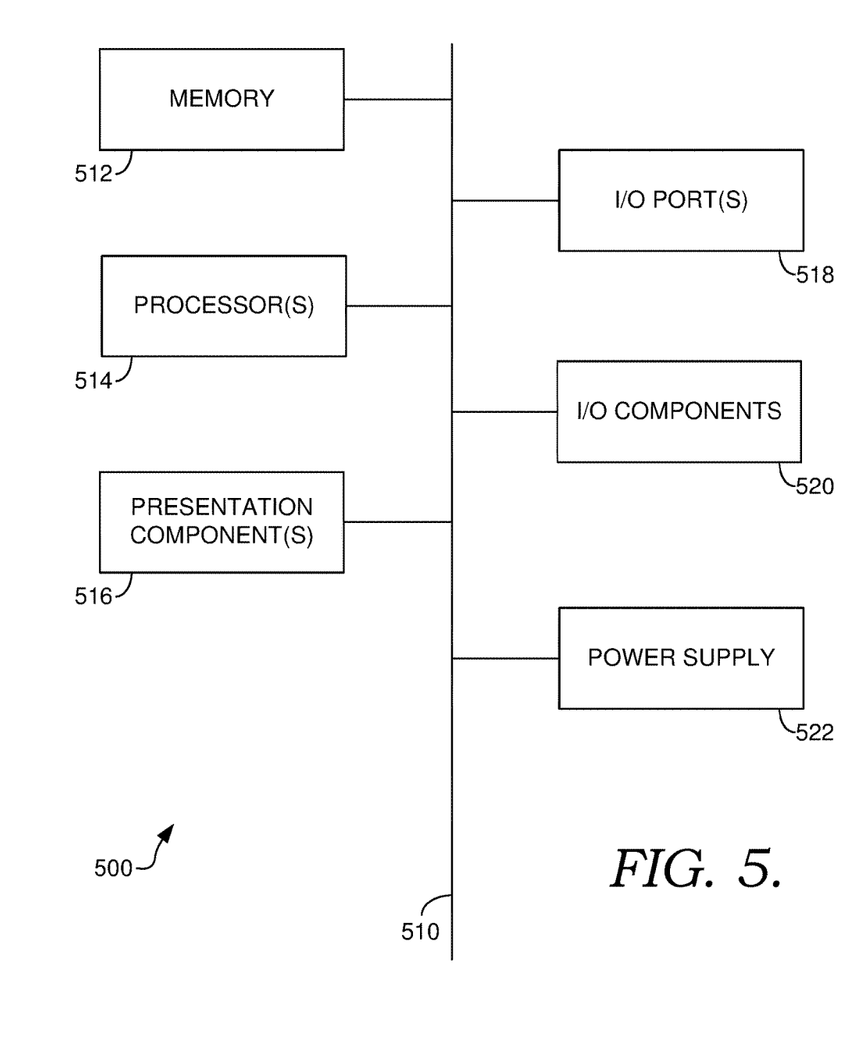
FIG. 5 is a block diagram of an exemplary computing environment suitable for use in implementing an embodiment of the present disclosure.

Having described various implementations, an exemplary computing environment suitable for implementing embodiments of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of embodiments of the disclosure. Neither should the computing device 500 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, or more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation," "server," "laptop," or "handheld device," as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include for example solid-state memory, hard drives, and optical-disc drives. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, or a wireless device. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) (or similar wireless communication components). The radio transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computing system for selecting at least one people highlight, with respect to a person of interest, to be shown on a user device, comprising:
   one or more processors; and
   computer storage memory having computer-executable instructions stored thereon which, when executed by the one or more processors, implement a method for selecting a people highlight to be shown on the user device, the method comprising:
   monitoring the user device b determine a user interest in a person of interest;
   determining a set of possible people highlights, with respect to the person of interest;
   determining a user context relative to the person of interest;
   ranking the set of possible people highlights based on the determined user context;
   based on activity patterns learned from other similar users and the ranked set of possible people highlights, determining to suppress and not present at least one people highlight from the set of possible people highlights;
   modifying the ranked set of possible people highlights to remove the at least one people highlight determined to be suppressed to create a subset of people highlights; and
   presenting on the user device, one or more people highlights from the subset of people highlights comprising a category corresponding to the user context associated with the one or more people highlights.

2. The computing system of claim 1, wherein the method further comprises:
   wherein ranking the set of possible people highlights is further based on presentation location, relationship of the person of interest, or user category preferences.

3. The computing system of claim 2, wherein the user context comprises one or more of location data, user device characteristics, user activity information, sensor information, or any user pattern information.

4. The computing system of claim 1, wherein the determining to suppress and not present at least one people highlight from the set of possible people highlights is based at least in part on at least one of: a set of periodic or time-based rules; past user behavior; a determined user interest; and a determined context for the at least one people highlight.

5. The computing system of claim 4, wherein determining to suppress and not present the at least one people highlight comprises determining a suppression weighting for the at least one people highlight, and suppressing the at least one people highlight if the suppression weighting is above a threshold.

6. The computing system of claim 4, wherein the determined user interest is based on explicit information according to user preferences.

7. The computing system of claim 1, wherein determining to suppress and not present at least one people highlight from the set of possible people highlights is based on an indication associated with the person of interest indicating the person of interest desires to suppress the highlight.

8. The computing system of claim 1, wherein determining to suppress and not present at least one people highlight from the set of possible people highlights is based, at least in part, on past behavior of at least one second user similar to the user.

9. A method for selecting at least one people highlight, with respect to a person of interest, to be shown on a user device, the method comprising:
   monitoring the user device to determine a user interest in a person of interest;
   determining a set of possible people highlights, with respect to the person of interest;
   determining a user context relative to the person of interest;
   ranking the set of possible people highlights based on the determined user context;
   based on activity patterns learned from other similar users and the ranked set of possible people highlights, determining to suppress and not present at least one people highlight from the set of possible people highlights;
   modifying the ranked set of possible people highlights to remove the at least one people highlight determined to be suppressed to create a subset of people highlights; and
   presenting on the user device, one or more people highlights from the subset of people highlights comprising a category corresponding to the user context associated with the one or more people highlights.

10. The method of claim 9 further comprising:
ranking the set of possible people highlights based upon the determined user context.

11. The method of claim 10, further comprising presenting only a determined selected portion of the ranked set of people highlights.

12. The method of claim 9, wherein the determining to suppress and not present at least one people highlight from the set of possible people highlights is based at least in part on at least one of: a set of periodic or time-based rules; past user behavior; a determined user interest; and a determined context for the at least one people highlight.

13. The method of claim 12, wherein determining to suppress and not present the at least one people highlight comprises determining a suppression weighting for the at least one people highlight, and suppressing the at least one people highlight if the suppression weighting is above a threshold.

14. The method of claim 12, wherein the determined user interest is based on explicit information according to user preferences.

15. The method of claim 9, wherein determining to suppress and not present at least one people highlight from the set of possible people highlights is based on an indication associated with the person of interest indicating the person of interest desires to suppress the highlight.

16. The method of claim 9, wherein determining to suppress and not present at least one people highlight from the set of possible people highlights is based, at least in part, on past behavior of at least one second user similar to the user.

17. A method for selecting at least one people highlight, with respect to a person of interest, to present on a user device, the method comprising:

determining a user interest in a person of interest;

collecting a set of possible people highlights, with respect to the person of interest;

determining a user context relative to the person of interest;

ranking the set of possible people highlights based on the determined user context;

based on activity patterns learned from other similar users and the ranked set of possible people highlights, determining to suppress and not present at least one people highlight from the set of possible people highlights;

modifying the ranked set of possible people highlights to remove the at least one people highlight determined to be suppressed to create a subset of people highlights; and presenting on the user device, one or more people highlights from the subset of people highlights comprising a category corresponding to the user context associated with the one or more people highlights.

18. The method of claim 17, further comprising using the determined user context in determining to suppress and not present at least one people highlight from the set of possible people highlights.

19. The method of claim 17, wherein determining to suppress and not present at least one people highlight from the set of possible people highlights is based, at least in part, on past user behavior.

20. The method of claim 17, wherein determining to suppress and not present at least one people highlight from the set of possible people highlights is based, at least in part, on past behavior of at least one second user similar to the user.

* * * * *